United States Patent [19]
Walsh

[11] Patent Number: 5,427,198
[45] Date of Patent: Jun. 27, 1995

[54] LADDER AND METHOD OF CONSTRUCTION

[76] Inventor: Michael P. Walsh, 23-25 Williams Road, Ringwood, Victoria 3134, Australia

[21] Appl. No.: 839,407

[22] Filed: Feb. 20, 1992

[30] Foreign Application Priority Data

Feb. 20, 1991 [AU] Australia ............... PK4698

[51] Int. Cl.⁶ .............................................. E06C 7/08
[52] U.S. Cl. ................................ 182/46; 182/228
[58] Field of Search .............. 182/228, 46; 156/293, 156/296; 403/203, 265, 267

[56] References Cited

U.S. PATENT DOCUMENTS

| | | | |
|---|---|---|---|
| 2,584,133 | 2/1952 | Koochembere | 403/265 X |
| 3,009,532 | 11/1961 | Richards et al. | 182/228 X |
| 3,098,698 | 7/1963 | Glynn | 156/293 X |
| 3,158,224 | 11/1964 | Van Name et al. | 182/228 X |
| 3,225,862 | 12/1965 | Fink | 182/228 X |
| 3,477,544 | 11/1969 | Hopfeld | 182/228 |
| 3,540,763 | 11/1970 | Yee | 403/265 |
| 4,634,487 | 1/1987 | Karo | 182/228 X |
| 5,031,272 | 7/1991 | Carmien | 403/267 X |

FOREIGN PATENT DOCUMENTS

| | | |
|---|---|---|
| 35476/84 | 10/1987 | Australia . |
| 68615/87 | 2/1990 | Australia . |
| 359054 | 3/1990 | European Pat. Off. ............ 182/228 |
| 2814369 | 4/1979 | Germany ........................... 182/228 |

Primary Examiner—Alvin C. Chin-Shue
Attorney, Agent, or Firm—Christensen, O'Connor, Johnson & Kindness

[57] ABSTRACT

The present invention provides an article which incorporates a jointed component, preferably a ladder, that includes a first member, a suitably aligned internal annuli, a second member, and a setting medium. The first member is formed of hollow section channel and has at least one socket in the form of a hole formed therein. The internal annuli is disposed within the first member and has opened ends aligned with the hole and splines extending within the annuli. The annuli also includes at least one angled flange disposed at one end of the annuli for receiving a portion of the setting medium. The second member is engaged within the annuli. The second member has a sealed end and is adapted to snugly fit into the socket. The setting medium is disposed between the end of the second member and the first member and between at least a portion of the interface between the second member and annuli. The invention provides a unique and highly reliable jointing method applicable to non ductile materials and, in particular, to fiberglass.

4 Claims, 9 Drawing Sheets

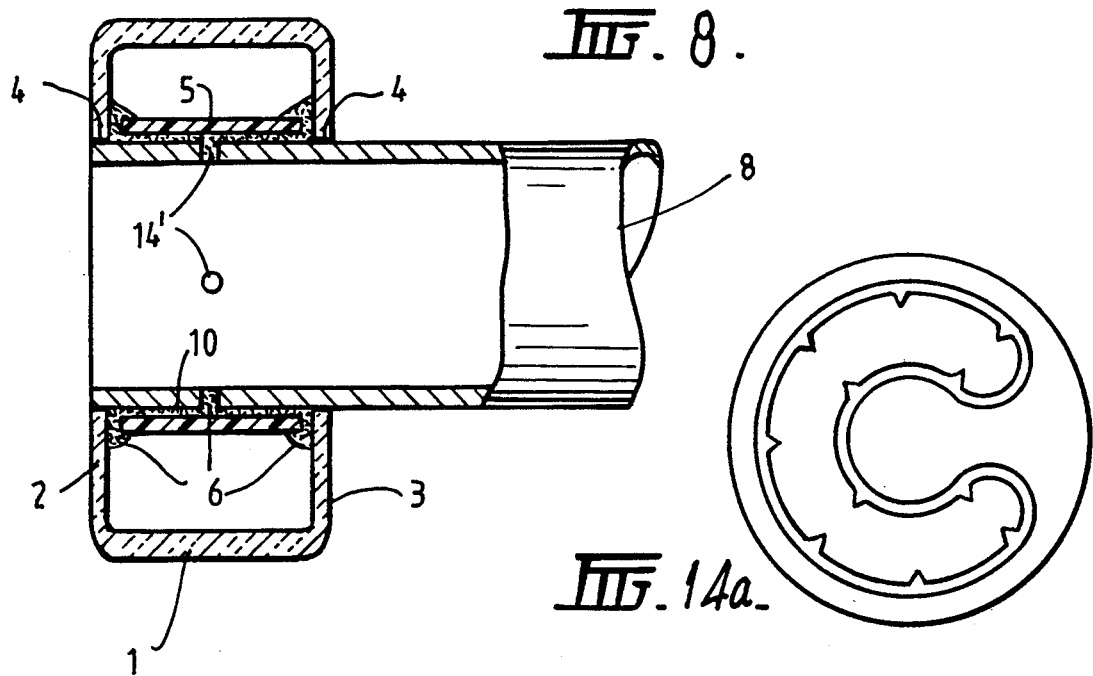
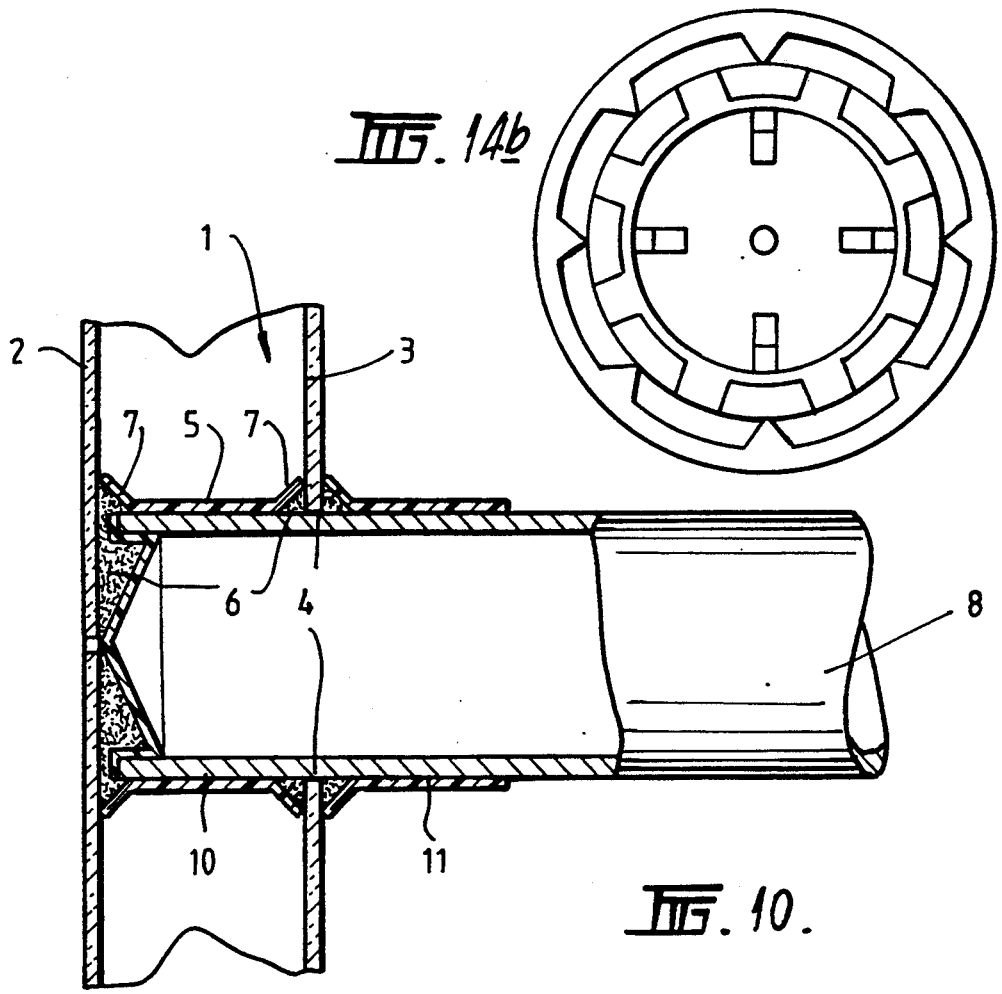

LADDER AND METHOD OF CONSTRUCTION

INTRODUCTION TO INVENTION

This invention relates to constructs in fibreglass and in particular to constructs involving fibreglass members adapted to withstand shear forces and bending about a plurality of axes, for example ladders. The invention provides an improved method of joining such fibreglass members and an improved joint per se.

BACKGROUND OF INVENTION

Fibreglass as a constructional material enjoys a broad range of characteristics which render it a useful and versatile medium. In particular, fibreglass is readily mouldable into a tough, durable material having highly predictable strength characteristics. Fibreglass has a high strength to weight ratio and good thermal and electrical insulating properties. Fibreglass also has excellent resistance to corrosion and other beneficial properties which render it a particularly attractive material for the construction of ladders and the like.

However, among the restrictions that fibreglass suffers is a limitation applied to its workability by virtue of its lack of ductility. Ductility allows a material to be pressed and pushed into shape. Hence, in the construction of multiple molding constructs of fibreglass, any joints must be either welded, glued or fastened together to effect a reliable joint. Such requirements place a considerable limitation on the type of joining economically available to fibreglass constructs and in particular to small surface area, medium to high stress joints exposed to shear forces and bending about a plurality of axes, for example the rungs of a ladder as they are joined to the stiles. Such joints are difficult to execute in fibreglass as the usual method of pressing ferrules formed in the rungs abutting the stiles cannot be formed on a non-ductile material like fibreglass. The use of glues or welding is limited by the difficulty of injecting sufficient glue into the joint so as to effect maximum bonding of the small surface areas involved.

OBJECT AND STATEMENT OF INVENTION

One object of the instant invention is to provide an improved method of joining, and an improved resultant joint, in fibreglass.

A further object of the invention is to provide an improved ladder or other device incorporating the said joint.

Accordingly, the invention provides a method of joining fibreglass components where a first member with a socket therein is engaged with a second member adapted to snugly fit into said socket wherein said second member has a sealed end, said method characterized by injection of a setting medium into said socket—second member interface wherein application of pressure to said setting medium effects distribution thereof to said interface and surrounds.

The first member may be formed of hollow section channel with the sockets formed by boring holes into the side of the channel such that the inside of the channel is exposed, wherein annuli can be inserted into the internal cavity of the channel and aligned with the holes to effect sealed sockets.

The internal annuli may be formed of high density polyethylene tubing, flanged at either end such that the combination of the annuli and the holes form the receiving sockets in the first member.

Once the sockets are formed, either as detailed above, or by other methods detailed later in the description, the setting medium may be injected into the socket such that once the second member is engaged with the socket and locked into place the setting medium is forced to squeeze into place and then to conform to the pressure of the engagement by exuding into the interface between the annuli and the second member.

In a particularly preferred form of the invention further annuli may be placed on the outside of the channel member to receive any excess fixing medium and this excess may provide a further aspect of adhesion to the joint.

The above jointing may be used to join fibreglass to fibreglass or fibreglass to another material, for example aluminium.

The preferred setting medium is an epoxy resin or a thermosetting resin.

In a further aspect, the invention provides an article incorporating a join as detailed above.

The article may take the form of a ladder having fibreglass stiles as the first member and aluminium rungs as the second members where in said members are Joined according to any of the aforesaid methods.

Another form of the invention is a grate.

The injection of the setting medium can be accomplished in a number of ways either from an external source or an internal source activated by penetration of the stile sockets by the rungs.

In the case of an external source of setting medium, the rung ends may be provided with a number of radial holes adapted to communicate directly with the annular sleeve and provide a means of injecting the setting medium into the joint. Alternatively the rung end could be provided with a cap adapted to deflect an injection of setting medium around the end of the rung and into the sleeve-rung interface.

In the case of an internal source of setting medium, a telescopic cap, or reservoir, may be provided in the end of the rung which is filled with setting medium and adapted to expel said setting medium into the sleeve-rung interface upon penetration of the stile by the rung.

The stiles may incorporate either a blind or through socket and in either case may incorporate an annular sleeve adapted to fit within the hollow member so as to form an integral part of the said socket and effect efficient adhesive distribution and an increased surface area for bonding.

DETAILED DESCRIPTION OF THE INVENTION

The invention shall now be described in greater detail by reference to the following particularly preferred embodiment as detailed herein:

FIG. 1 shows a cross-section of a completed joint;
FIG. 2 details the formation of the annuli;
FIG. 3 shows detail of section B—B of FIG. 1;
FIG. 4 shows the loading factors associated with the joint of the invention;
FIG. 5 shows the force comparison between double place joints and single plane joints;
FIGS. 6 and 7 detail glue flow considerations as they apply to the instant invention with FIG. 6 showing optimal press rate, FIG. 7(a) showing the results of a slow press rate and FIG. 7(b) showing the results of a fast press rate.

FIGS. 9 and 10 detail end and cross-sectional representations of the ladder joint of an alternative embodiment of the invention.

FIG. 8 shows an alternative embodiment of the ladder joint.

FIG. 10 represents an end cap method of external delivery.

FIG. 14 represents a method of installing the annular sleeves.

Figure 1:
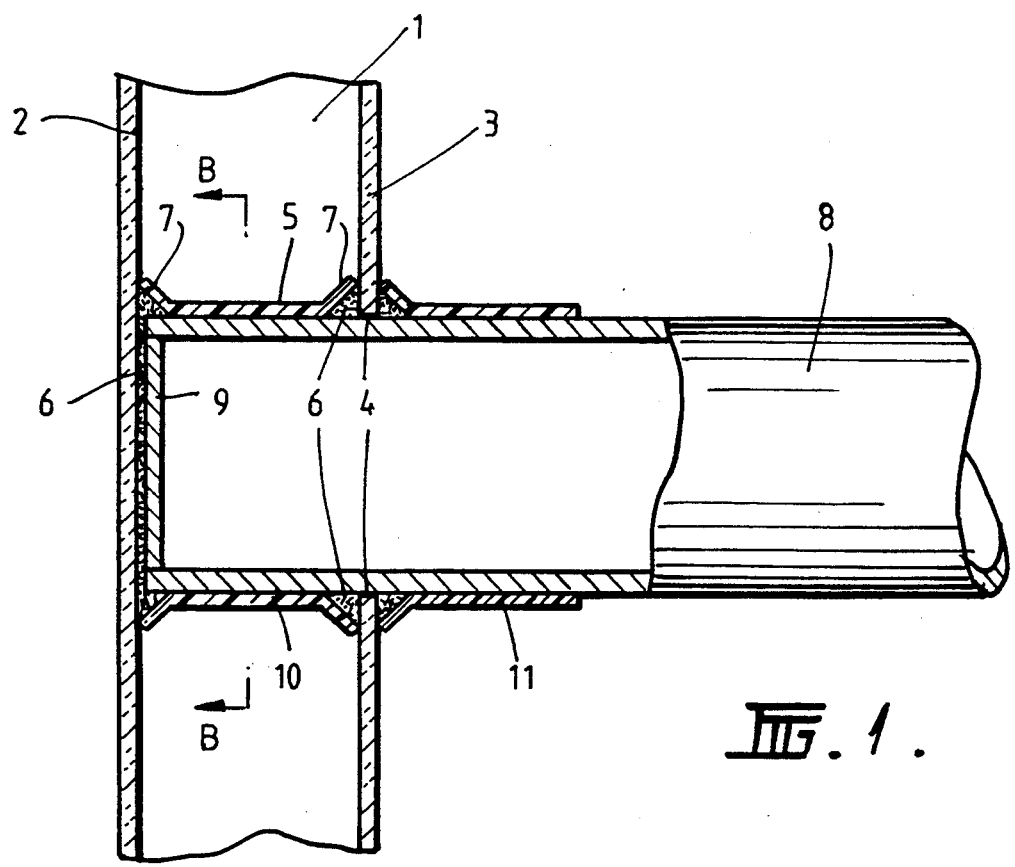

Referring firstly to FIG. 1, the particularly preferred form of the joint is detailed herein utilizing a hollow channel fibreglass section as the first member 1 having an internal side 3 and an external side 2. The socket is formed in this first member by boring a hole 4 through the inside face of the first member thereby exposing the inside of the channel. In order to form the socket, annulus of polyethylene 5 is inserted into the internal cavity of the channel so as to align with the bored hole 4. Once aligned, the annulus forms a sealed socket in the first member into which a setting medium or epoxy resin 6 may be injected.

Once a suitable amount of epoxy is injected into the socket the second member 8 having a sealed end 9 may be pressed into the socket. The action of pressing will compress the epoxy until the whole of the bottom of the socket is covered with glue wherein continued engagement will cause the glue to migrate up the annulus—second member interface 10 and, if a suitable quantity of glue is used shall migrate through the hole 4. In order to utilize the excess glue and optimize the joint strength a further external annulus 11 may be used to capture the glue and form a third bead of glue.

FIG. 2 gives a detailed demonstration of the formation of the annuli where high density polyethylene tube 12(A) is provided with internal splines (13) and then cut into suitable lengths. The annuli are then provided with a collar 14 which is subsequently flared 15.

Figure 3:
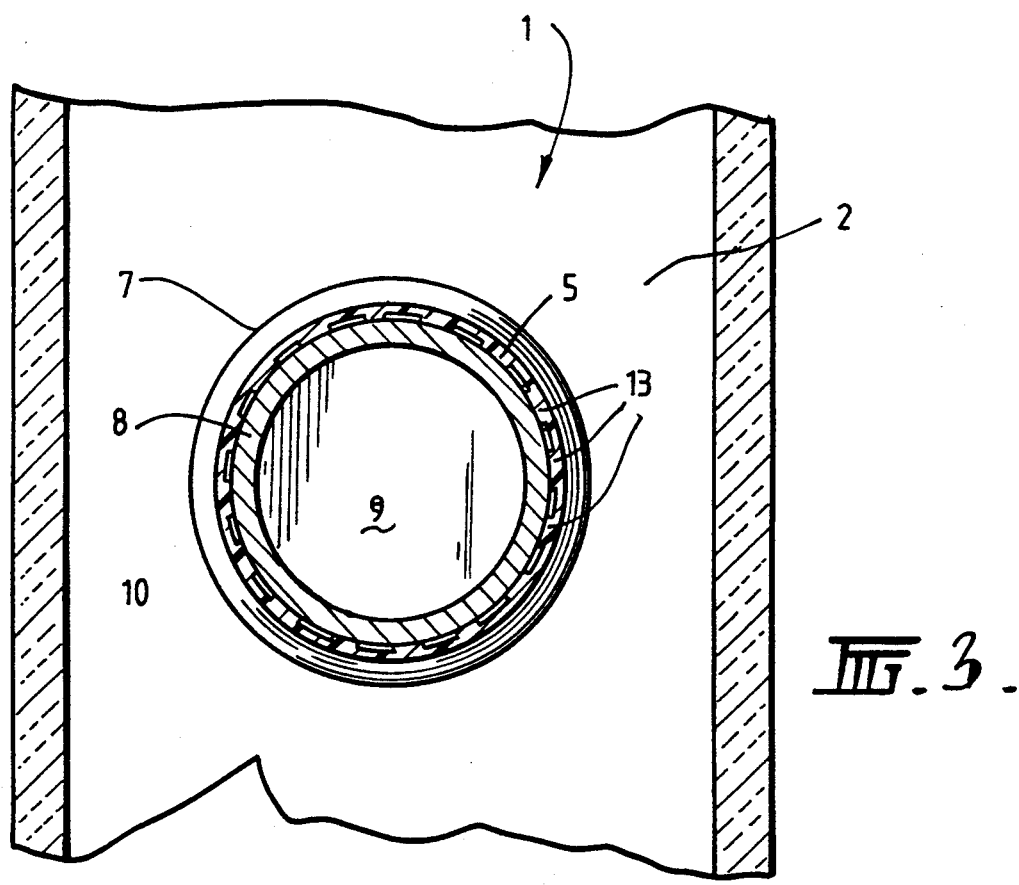
Figure 2A:
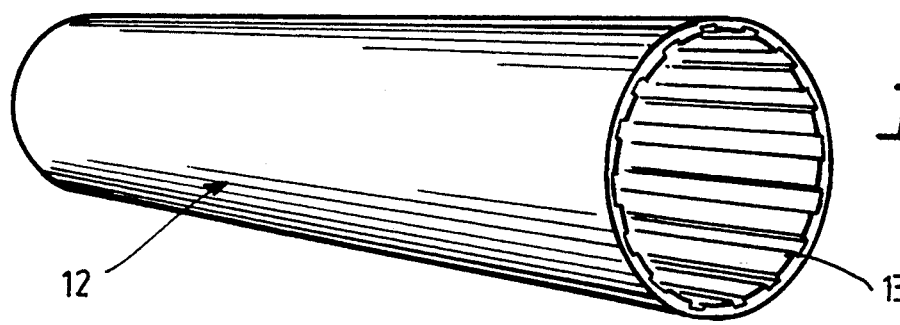
Figure 2B:
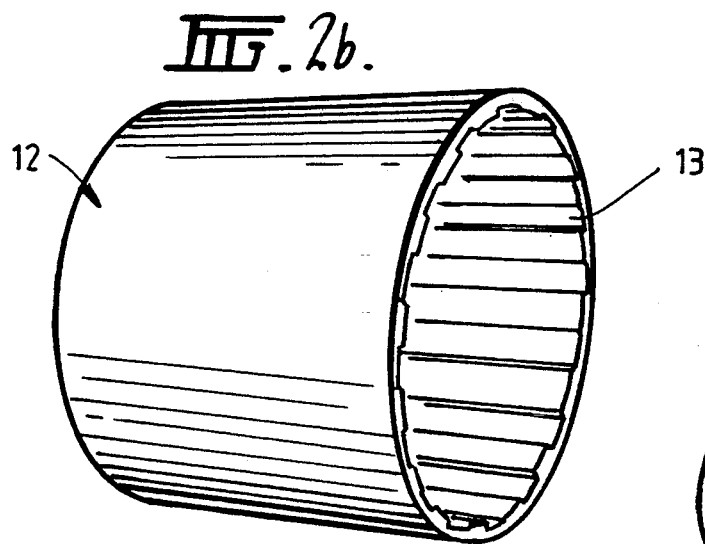
Figure 2C:
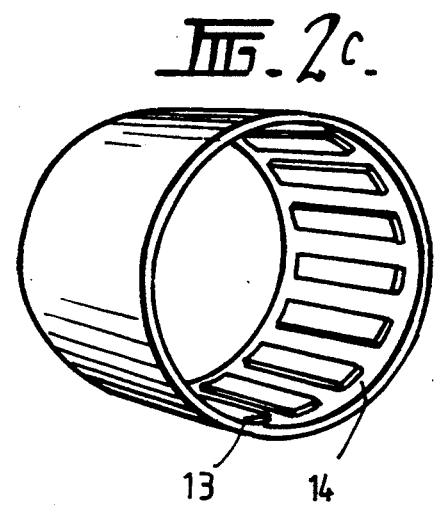
Figure 2D:
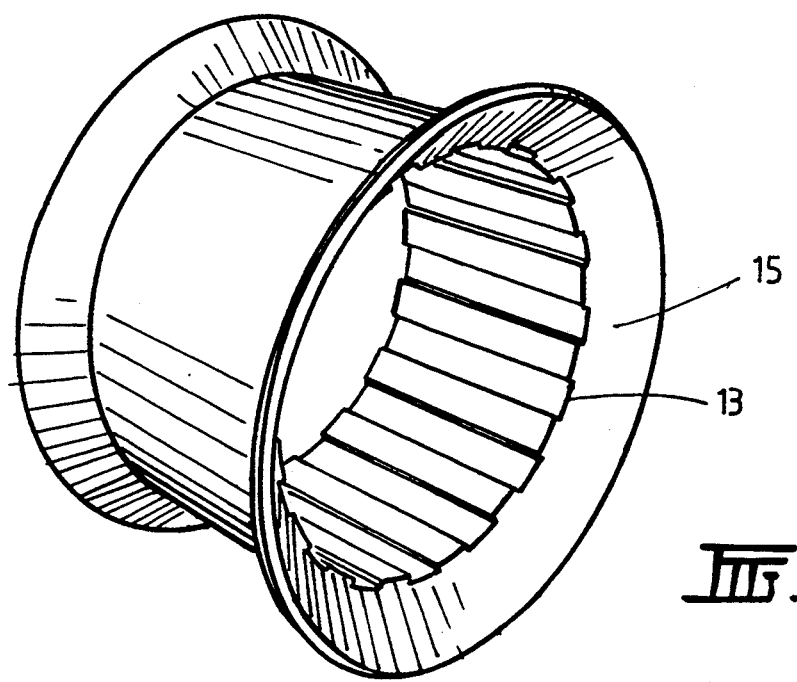

FIG. 3 details a section B—B of FIG. 1 showing the spline allowance 13 of the annuli and the snug relationship of the second member 8 and the socket or annulus.

Figure 6A:
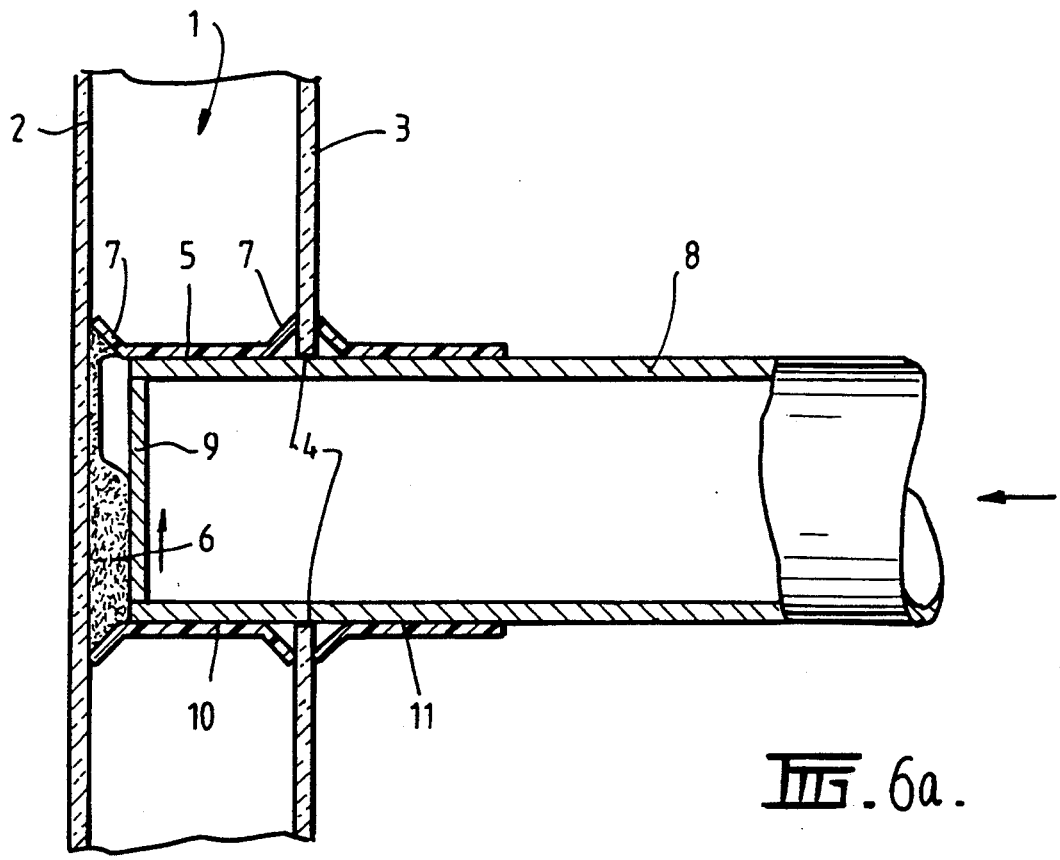
Figure 6B:
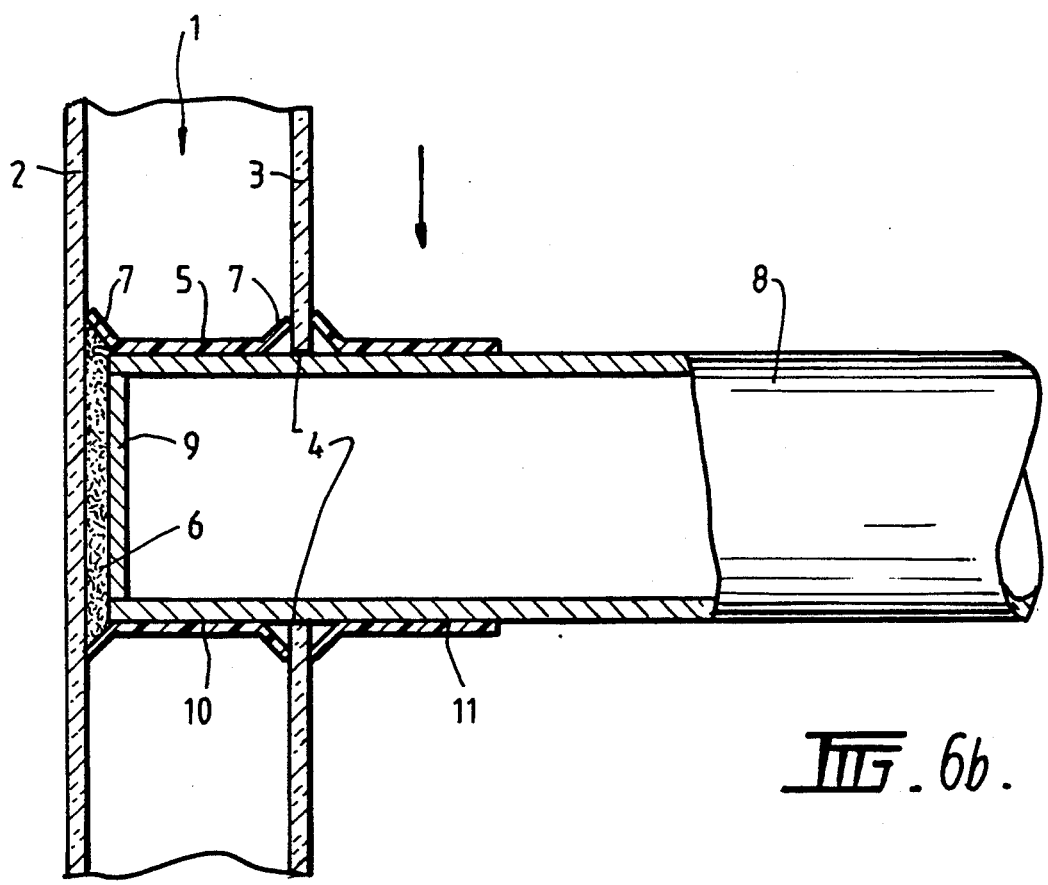

FIGS. 6 and 7 detail the method of the invention where the rate of assembly of the component members has an influence of the quality of the joint. FIG. 6 shows an optimal rate of engagement of the second member 8 into the socket or hole 4 such that the end result of the jointing action is a small air bubble at the bottom cavity which is ejected through the annulus with the final pressing of the joint.

Figure 7A:
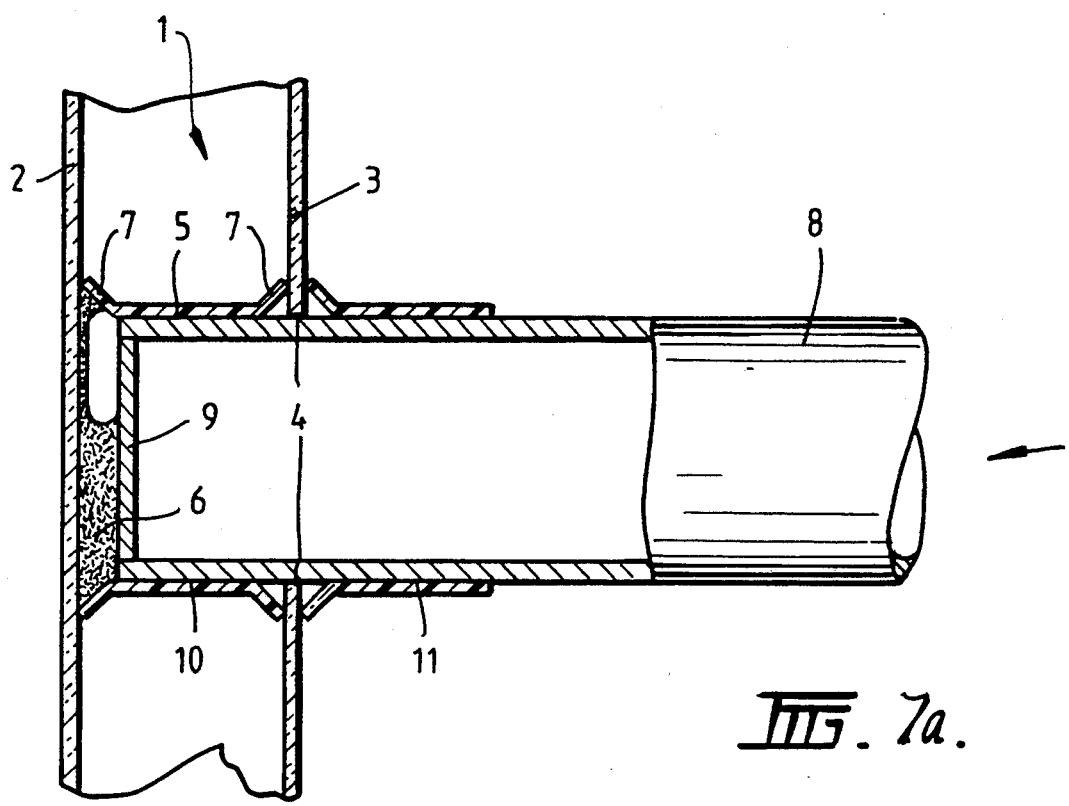

FIG. 7a shows the possible result of engaging the members too slowly where the end of the second member becomes wetted too early.

Figure 7B:
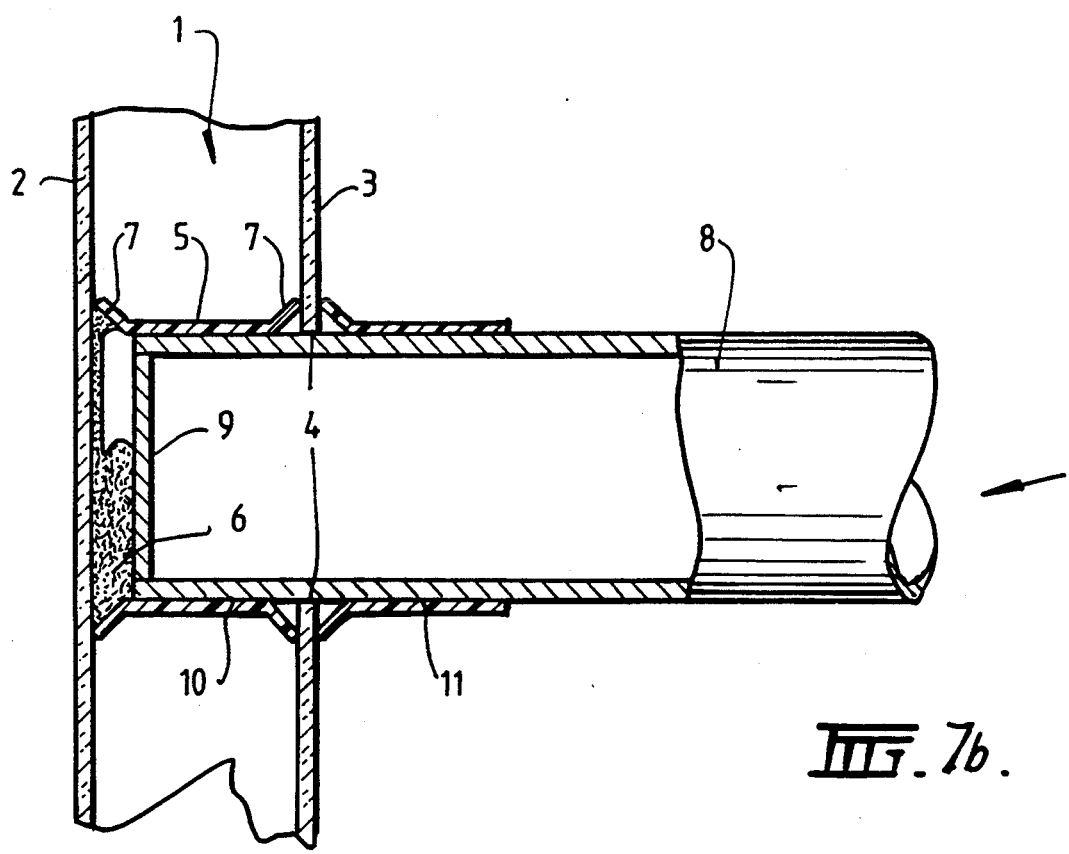
Figure 9A:
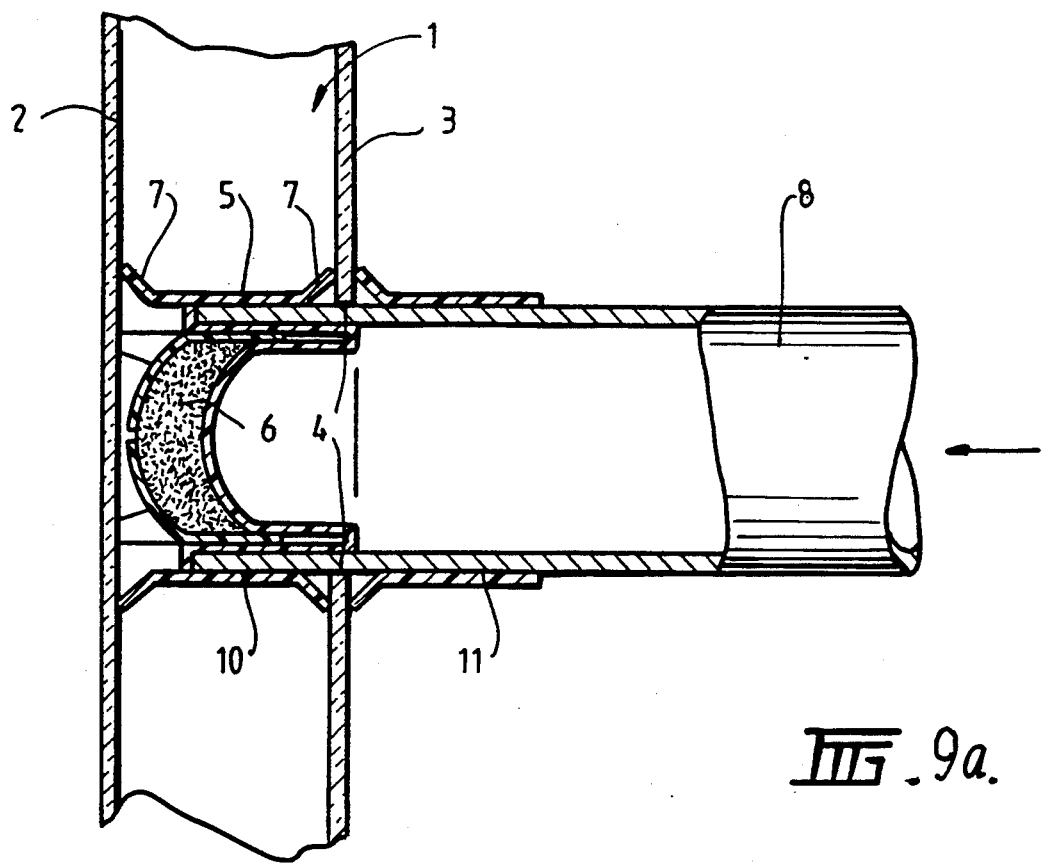
FIGS. 9a and 9b represent an internal source of setting medium using telescopic reservoirs.
Figure 9B:
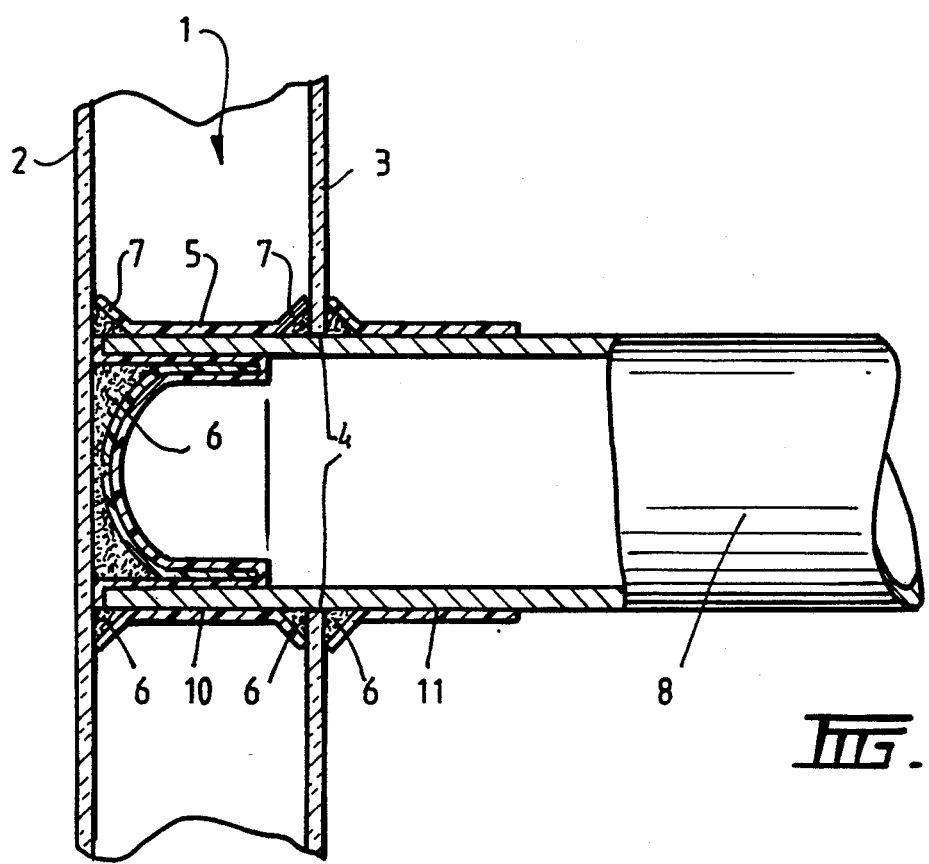

FIG. 7b shows the possible result of engaging the members too quickly where a surge of flue can compromise the formation of an optimal S-shaped meniscus at the air bubble.

FIG. 8 gives clear representation of another type of the joint where the hollow first member 1 has two holes 4 forming a through socket. The second member 8 is of hollow, circular cross-section having a diameter less than that of the said socket and forming an interface 10 therein, between itself and the first member. The second member has radial bores 14 forming the channels for communication and insertion of the setting medium 6. The holes particularly facilitate very thorough delivery of the setting medium into the interface. In order to further facilitate efficient use of setting medium, a sleeve or annulus 5 can be inserted into the first member to form a shield to disperse the setting medium as well as a further anchorage point to increase the surface area for bonding. The annulus should preferably have a diameter about the same or greater than the diameter of the holes 4.

PARTICULAR DETAILS OF JOINT CONFIGURATION

The closed hollow rectangular section is inherently better in torsion about its central axis, parallel to the stile, than the C or I sections used in many ladders presently produced. This structural section reduces twisting and swaying tendencies which are disconcerting and can be dangerous to the ladder user. Accordingly, this section is the preferred form for the invention.

Figure 5A:
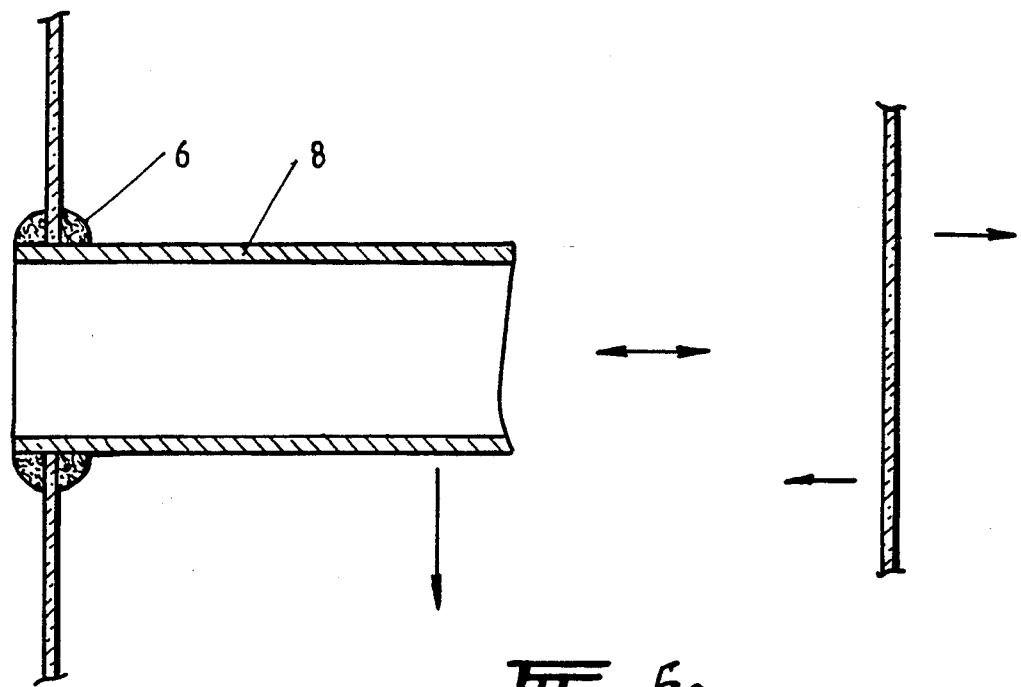
Figure 5B:
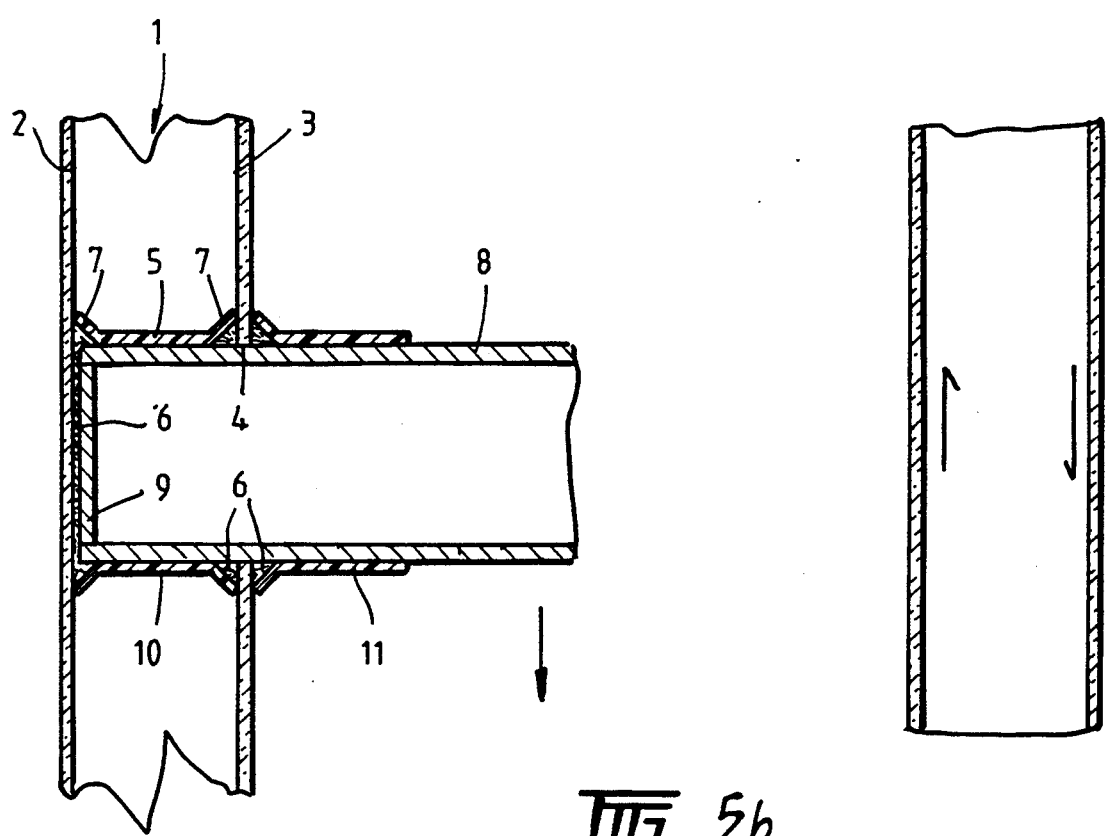

The closed section also offers two webs forming parallel planes to which the rung may be attached. Forces transferred through the joint are shared by each web and reduce as the distance between the webs increase. The moment capacity of the joint is greatly increased compared with a single web joint (see FIG. 5).

Connection between the rung and each web or side wall of the stile is made by a suitable adhesive appropriately moulded within the joint to mechanically fix the two members together. Epoxy type adhesives are preferred for this application as their viscous flowing properties and strong adhesion to materials used in the construction of ladders (i.e. fibreglass and aluminium) facilitate optimal assembly and strength.

STRENGTH CONSIDERATIONS

To assess the strength of the joint, a standard test was adopted to simulate stresses that a ladder would experience under conditions of sway, twist and racking. Forces applied to the ladder to set up such conditions are quantified in the American standard, ANSI 14.5 for F/G ladders and served as a minimum criteria for strength. The standard test described in FIG. 4 however presents more severe conditions on the test joint than the forces applied to a complete ladder. It gives a useful scale on which to compare different joints and if satisfying this test they should pass tests for whole ladders. Other tests such as rung pull out and twisting of the rung about its own axis were carried out after the joint was optimized for the bending test which we deemed to be the most important.

The critical part of the joint under stress from this test proved to be the region where the end of the rung connected the outside stile web plane. Drilling all the way through the outside web to gain a mechanical lock decreased joint strength due to weakening of the web and limitations of physically attaching the two members with glue.

The strongest configuration for both F/G and aluminium rungs proved to be an end plug, being of similar material to the rung, pressed, and glued in the case of F/G into the end of the hollow rung to form a square flat end. This creates maximum surface area for bonding between rung and stile and allows even distribution of the shear force between the relatively stiff stile web and plugged rung end.

Figure 4:
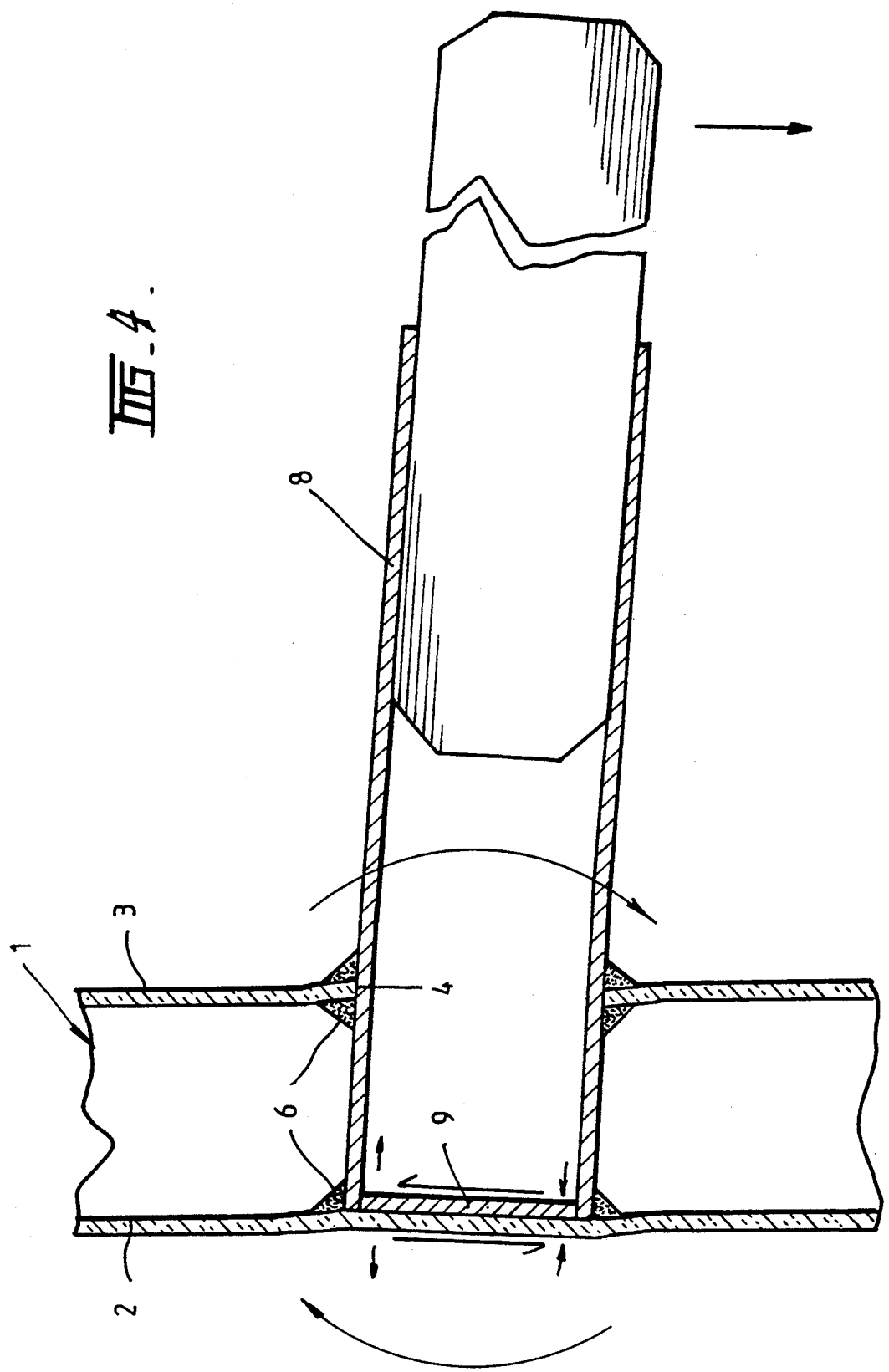

Reducing the glue thickness between these surfaces allows the connection to reply on the adhesive properties of th4e slue rather than its structural properties for transferring load. As shown in FIG. 4 there is tension and compression on this plane also. These forces control the mode of failure when fracture occurs on this plane. The top of the rung (from the diagram) reaches critical stress first due to the addition of maximum tension and sheer force. Initial fracture at the top of the interface results in reduced bearing area causing the fracture to propagate from top to bottom and joint failure occurs. This is heard as a loud sudden crack.

In this type of failure either the bond between rung end and glue, or glue and stile results depending on which interface was strongest. F/G rungs when properly prepared for the glue typically fail by leaving the plug attached and breaking the rung and the fillet of glue around the end of the rung. This indicates that we are surpassing the limitations of the rung's circumferential strength and the fillet of glue before that of the glue plug. It was found that square profile concentric circles about the axis of the rung proved to efficient for this connection and lifted the joint strength to a level where rung strength became the limiting factor. Failure usually occurred by yielding of the rung circumferentially and breaking of the outer fillet of glue. By the time this was achieved the joint displayed a strength of nearly three to four times that required for full ladder tests according to standards.

The rounded fillets of glue at each end of the annulus and the stile side of the wear strip act to distribute forces evenly from rung to stile and hold the inside web of the stile securely. This was evident as no failure occurred at this point during any of the tests.

Typical ultimate moment carrying capacity for the final joint under this test were 170 Nm to 190 Nm for F/G rungs 2.5 mm thick and 1.6 mm aluminium rungs. Rung twist tests about rung axis were 90 Nm to 100 Nm.

The joint strength could conceivably be raised if necessary by introducing reinforcement into the fillet of glue around the end of the rung to support it and prevent failure of the rung from either fracture (F/G rungs) or yielding (aluminium rungs). This has been demonstrated by using thicker aluminium rungs which improved joint strength presumably from the higher forces required to yield the end of the rung. The reinforcement could take the form an aluminium ring slipped in during annulus loading or even glass fibres placed around the fillet cavity.

PERFORMING THE JOINT

The key aspect to performing this type of joint lies in forming cavities inside and outside the style to contain and direct the glue to the right places while minimising air entrapment. This needs to be relatively easy to affect for production reasons and the cost of components within the joint kept to minimum.

The annulus which forms the inside cavity is made from extruded High Density Polyethylene type about 1./5 mm thick. A number of channels run longitudinally along the inside for the F/G rung joint but is left plain for aluminium rungs. (The ribs that form the grip on the outside of the rung form communication channels for glue flow through the joint). The tube is cut to size, inside ends shaved to about 1.0 mm thickness and then flared to 45 degrees (see FIG. 2). The outside cavity follows a similar procedure except that only one end is formed. This we call a "wear strip" because it also acts as a protective strip around the rung preventing fibreglass wear on the other ladder and latch wear.

The annulus is made to be a tight fit within the stile to form a press seal on each lip of the flare and effect a closed cavity. Both the annulus and wear strip are a friction fit over the rung so that wear strip forms a seal on the outside of the stile during the pressing of the rung into the joint. When this pressing is completed, the friction fit of the rung in the annulus prevents the rung from springing back out and therefore maintains this outer seal. Due to the right arrangement of these seals, the joint is quite rigid before the glue sets and the ladder can be handled without the aid of clamps immediately after pressing.

The F/G rungs are prepared by either sandblasting or other suitable means for abrasion to expose the non-glass surface tissue so the glue can properly wet the surface and affect a good bond. It also prepares the rung for a non-slip coating of epoxy and finely graded sand. A bead of glue is placed at the end of the rung around the inside edge to receive the F/G plug designed to press fit into the end of the rung. We have designed the drill that sizes the holes in the stile so that the waste core may be used to form the end plug. It is then press fit 0.3 mm to 0.4 mm past the end of the rung to break edges of the core and obtain a neat fit. Both ends are pressed in a rig at the same time and left to set before the ends are shaved to leave a fresh square flush end. It was deemed necessary to glue the F/G plugs into the ends as the pres-fit could not be relied on to stay fixed during joint pressing. It also adds strength to the joint by rigidly adhering the plug to the rung helping prevent pull out.

Aluminium rungs, having corrugations on the outside for grip and as a means of communicating the glue through the joint, do not require all over sandblasting or abrasion of the surface, as with F/G rungs. However, the ends of the rungs with their flush aluminium ends need to be prepared by either abrasive or chemical cleaning after machining the end pattern. A chemical substrate air drying paint is then applied to the aluminium rung ends to which the epoxy can bond strongly. With the rungs and stiles suitably prepared for gluing we may introduce the glue and press the ladder together.

As can be seen from the foregoing, the instant invention provides a unique and highly reliable jointing method applicable to non-ductile materials and in particular to fibreglass.

Numerous items, for example, ladders are particularly well suited to fibreglass construction being light, strong and not electrically conductive. The joint disclosed herein is particularly adaptable as the rung and stile joint allowing the construction of a particularly sturdy and safe ladder.

Similarly, grates can be produced from fibreglass having high corrosion resistance and high rigidity.

The method of manufacture using the instant invention may involve alignment of a plurality of joining members and a plurality of sleeves inside the first members. Such alignments may be assisted by annuli .adapted to sit tightly on the second members to facilitate insertion and alignment into the first members, but wherein said annuli have a plasticity which allows them to deform and expand under pressure of the setting material as it is injected such that the annuli expand out into the first member.

The particular mode of application of the setting material may be facilitated by the use of a tool adapted to inject the material through the communication channels at an appropriate pressure.

The entire contents of the provisional specification lodged with Australian Patent Application of which this is the complete specification is hereby imported into this specification and forms part of the disclosure of this specification. The claims form part of the disclosure of this specification.

I claim:

1. An article incorporating a jointed fiberglass component where a first member formed of a hollow section channel and having one or a plurality of sockets in the form of holes formed therein and a suitably aligned internal annulus is engaged with a second member having a sealed end and being adapted to snugly fit into said socket, wherein said annulus is flanged at one or both ends, said flanged annulus being entirely disposed within said channel, and wherein said jointed component is characterized by a setting medium injected into said socket/second member interface, such that said setting medium is located between and abuts the outer surface of said sealed end and an inside surface of said hollow section channel, and wherein application of pressure to said setting medium effects distribution thereof to said interface and surrounds.

2. An article incorporating a jointed fiberglass component where a first member formed of a hollow section channel and having one or a plurality of sockets in the form of holes formed therein and a suitably aligned internal annulus is engaged with a second member having a sealed end and being adapted to snugly fit into said socket, wherein said annulus includes internal splines to allow said setting medium to flow between said spines before it is set; and wherein said annulus includes at least one angled flange into which said setting medium is allowed to flow before it is set; wherein said jointed component is characterized by a setting medium injected into said socket/second member interface, such that said setting medium is located between and abuts the outer surface of said sealed end and an inside surface of said hollow section channel, and wherein application of pressure to said setting medium effects distribution thereof to said interface and surrounds.

3. An article incorporating a jointed fiberglass component where a first member formed of a hollow section channel and having one or a plurality of sockets in the form of holes formed therein and a suitably aligned internal annulus is engaged with a second member having a sealed end and being adapted to snugly fit into said socket, wherein said annulus includes internal splines to allow said setting medium to flow between said spines before it is set; and wherein said annulus further includes an angled flange around the end of said internal annulus opposite the sealed end of said second member, said angles flange being arranged and configured to receive a portion of said setting medium; wherein said jointed component is characterized by a setting medium injected into said socket/second member interface, such that said setting medium is located between and abuts the outer surface of said sealed end and an inside surface of said hollow section channel, and wherein application of pressure to said setting medium effects distribution thereof to said interface and surrounds.

4. An article incorporating a jointed component comprising:
(a) a first member formed of hollow section channel and having at least one socket in the form of a hole formed therein;
(b) a suitably aligned internal annulus disposed within said first member having open ends aligned with said hole and splines extending within said annulus, wherein said annulus further comprises at least one angled flange disposed at one end of said annulus for receiving a portion of the setting medium;
(c) a second member engaged within said annulus, said second member having a sealed end and being adapted to snugly fit into said socket; and
(d) a setting medium disposed between the end of said second member and said first member and between at least a portion of the interface between the second member ant the annulus.

* * * * *

UNITED STATES PATENT AND TRADEMARK OFFICE
CERTIFICATE OF CORRECTION

Figure 11A:
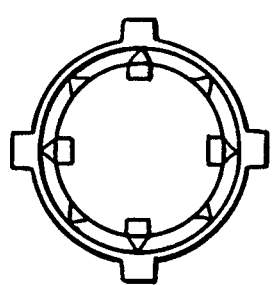
FIG. 11-13 represent alternative setting methods.
Figure 11B:
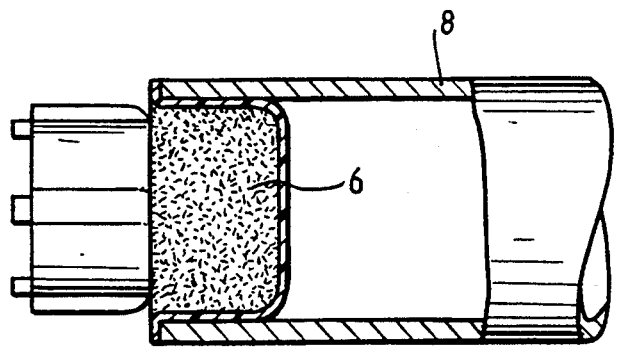
Figure 12A:
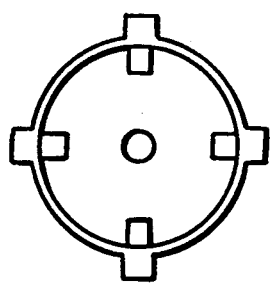
Figure 12B:
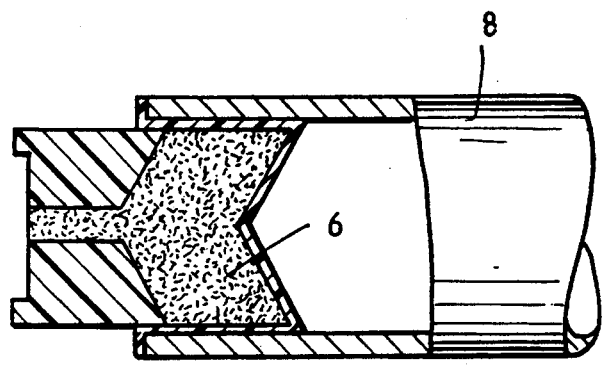
Figure 13A:
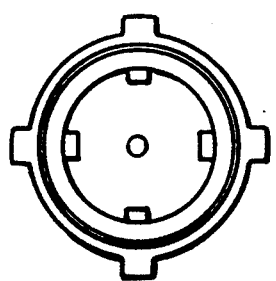
Figure 13B:
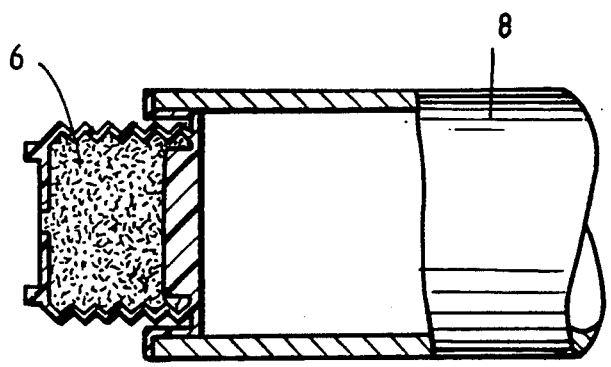

PATENT NO. : 5,427,198            Page 1 of 2
DATED : June 27, 1995
INVENTOR(S) : M.P. Walsh It is certified that error appears in the above-indentified patent and that said Letters Patent is hereby corrected as shown below:

| COLUMN | LINE | |
|---|---|---|
| 3 | 4-5 | Move "FIG. 8 shows an alternative embodiment of the ladder joint." to column 3, line 1. |
| 3 | 11 | "FIG. 11-13" should read --Figures 11-13-- |
| 4 | 68 | "th4e" should read --the-- |
| 5 | 44 | "form an" should read --form of an-- |
| 6 | 61 | ".adapted" should read --adapted-- |

UNITED STATES PATENT AND TRADEMARK OFFICE
CERTIFICATE OF CORRECTION

PATENT NO. : 5,427,198
DATED : June 27, 1995
INVENTOR(S) : M.P. Walsh

It is certified that error appears in the above-indentified patent and that said Letters Patent is hereby corrected as shown below:

| COLUMN | LINE | |
|---|---|---|
| 7 (Claim 2, | 33 line 8) | "spines" should read --splines-- |
| 8 (Claim 3, | 10 line 8) | "spines" should read --splines-- |
| 8 (Claim 3, | 14 line 8) | "angles" should read --angled-- |
| 8 (Claim 4, | 40 line 8) | "ant" should read --and-- |

Signed and Sealed this

Ninth Day of January, 1996

Attest:

BRUCE LEHMAN

*Attesting Officer*   *Commissioner of Patents and Trademarks*